United States Patent
Kogler et al.

(10) Patent No.: US 9,160,411 B2
(45) Date of Patent: Oct. 13, 2015

(54) COMMUNICATION PROCESS FOR ELEMENTS COMPOSING A HOME OR INDUSTRIAL ELECTRICAL ENERGY DISTRIBUTION NETWORK AND DEVICES FOR IMPLEMENTING THE SAME

(76) Inventors: Roland Kogler, Vence (FR); Thierry Schuffenecker, Cagnes sure Mer (FR)

( * ) Notice: Subject to any disclaimer, the term of this patent is extended or adjusted under 35 U.S.C. 154(b) by 1075 days.

(21) Appl. No.: 12/925,284

(22) Filed: Oct. 18, 2010

(65) Prior Publication Data

US 2011/0040419 A1 Feb. 17, 2011

(51) Int. Cl.
| | |
|---|---|
| H02J 13/00 | (2006.01) |
| G05B 11/01 | (2006.01) |
| H02J 1/10 | (2006.01) |
| H01P 5/00 | (2006.01) |
| G06F 15/177 | (2006.01) |
| G06F 15/173 | (2006.01) |
| H04B 3/54 | (2006.01) |
| H04L 12/28 | (2006.01) |
| H04L 29/12 | (2006.01) |
| H04L 12/24 | (2006.01) |

(52) U.S. Cl.
CPC ............ *H04B 3/542* (2013.01); *H04L 12/2807* (2013.01); *H04L 29/12216* (2013.01); *H04L 41/0806* (2013.01); *H04L 61/2015* (2013.01); *H04B 2203/5408* (2013.01); *H04B 2203/5445* (2013.01); *H04B 2203/5454* (2013.01); *H04B 2203/5458* (2013.01); *H04L 12/2818* (2013.01); *H04L 2012/285* (2013.01); *H04L 2012/2843* (2013.01); *Y02B 70/325* (2013.01); *Y04S 20/228* (2013.01); *Y04S 40/162* (2013.01)

(58) Field of Classification Search
USPC .......................................... 700/97; 340/870.02
See application file for complete search history.

(56) References Cited

U.S. PATENT DOCUMENTS

| | | | |
|---|---|---|---|
| 6,005,759 A | 12/1999 | Hart et al. | |
| 6,826,690 B1 * | 11/2004 | Hind et al. | ............ 713/186 |
| 6,956,461 B2 | 10/2005 | Yoon et al. | |
| 6,961,633 B1 * | 11/2005 | Marbach et al. | ............ 700/97 |
| 7,276,915 B1 * | 10/2007 | Euler et al. | ............ 324/611 |
| 8,373,547 B2 * | 2/2013 | Benya et al. | ............ 340/12.33 |

(Continued)

FOREIGN PATENT DOCUMENTS

| | | |
|---|---|---|
| DE | 10244958 | 4/2004 |
| DE | 102004025056 | 12/2005 |

(Continued)

OTHER PUBLICATIONS

Int'l Search Report PCT/EP2009/002851 Mail date—Jun. 10, 2009.

(Continued)

*Primary Examiner* — Jennifer Mehmood
*Assistant Examiner* — Pameshanand Mahase
(74) *Attorney, Agent, or Firm* — Saile Ackerman LLC; Stephen B. Ackerman

(57) ABSTRACT

A communication process between two constitutive elements of the network of electricity distribution in a domestic or industrial premise including circuit breakers, electrical modules, switches, electrical plugs and light connection devices. The process including the following steps: assignment by a protocol such as DHCP, BootP or RARP of a first IP address to a first element of the power distribution network, assignment of a second IP address to a second element, and establishment of a communication between the first and second elements of the power distribution network.

48 Claims, 10 Drawing Sheets

(56) References Cited

U.S. PATENT DOCUMENTS

| | | |
|---|---|---|
| 2003/0078990 A1 | 4/2003 | Lee |
| 2003/0177268 A1 | 9/2003 | Youn et al. |
| 2003/0197426 A1* | 10/2003 | Carson et al. .................. 307/40 |
| 2007/0067046 A1* | 3/2007 | Berg ................................ 700/1 |
| 2008/0018491 A1* | 1/2008 | Berkman et al. ......... 340/870.02 |

FOREIGN PATENT DOCUMENTS

| | | |
|---|---|---|
| EP | 1062648 | 12/2000 |
| EP | 1128604 | 8/2001 |
| EP | 1 128 604 | 3/2004 |
| EP | 1521401 | 4/2005 |
| WO | WO 03/058481 | 7/2003 |
| WO | WO 2006/047185 | 5/2006 |
| WO | WO 2009/143940 | 12/2009 |

OTHER PUBLICATIONS

STMicroelectronics, AN2451 Application note, "ST7540FSK powerline transceiver design guide for AMR," Doc ID 12791 Rev 3, Jan. 2010, pp. 1-55.

TCP/IP Illustrated, vol. 1, The Protocols, by W. Richard Stevens, Addison-Wesley Publishing Co. Inc., Copyright 1994, Addison-Wesley Professional Computing Series, Chapters 4, 5 & 16, 32 pgs.

RFC 1058—Routing Information Protocol, Network Working Group, C. Hedrick, Rutgers University Jun. 1988, pp. 1-34, found: http://tools.ietf.org/html/rfc1058, Feb. 8, 2011.

"In One By Legrand, the smart home," Legrand, 18 pgs, Jan. 2006.

* cited by examiner

COMMUNICATION PROCESS FOR ELEMENTS COMPOSING A HOME OR INDUSTRIAL ELECTRICAL ENERGY DISTRIBUTION NETWORK AND DEVICES FOR IMPLEMENTING THE SAME

This is a continuation of International Application PCT/EP2009/002851, with an international filing date of Apr. 19, 2009, now abandoned.

TECHNICAL FIELD OF INVENTION

The present invention concerns electrical energy distribution networks for home and industrial premises and more particularly a communication process for elements composing a home or industrial electrical energy distribution network.

BACKGROUND

The development of home automation has resulted in ongoing investigations for increasing the intelligence of components composing the electrical energy distribution network, particularly in household.

For that purpose, searches were conducted for using the functionalities provided by the Internet network in order to increase the intelligence of the electrical appliances which are likely to be connected to the electrical energy distribution network.

European patent EP1217475 describes a device and a procedure of remote control of appliances based on the integration of a web server in the appliance and the connection of this server to an (ISP) Internet Service Provider. But this patent, and many others, does not suggest to incorporate the IP communication within the electrical energy distribution network, and particularly the different components composing such networks.

European Patent EP1349340 also describes a process for controlling a network of household appliances including a shared IP unit allocating private IP addresses or port numbers respectively to a high number of household appliances connected to the energy distribution network. Again, with this patent, the distribution network and its constitutive components such as circuit breakers, switches, power outlets etc. . . . remain totally outside the IP communication protocol.

Both examples which are mentioned above clearly illustrate, among others, the long and extensive research and investigations which are conducted in order to increase the possibilities of communication of the household appliances being connected to the electricity distribution network, particularly with the Internet network.

But those examples, although clearly demonstrative of the strong interest for increasing communication between the appliances, leave completely aside the IP communication within the heart of the electrical energy distribution network, and the particular components constitutive of such networks.

Some attempts were made to introduce communication within the heart of the electrical energy distribution network, but only at the costs of complex and expensive installations, and closely depending on the technical architecture set by the manufacturer, thus compelling the end-user to purchase all components at a single supplier.

A first example of such a system is the so-called IN-ONE BY LEGRAND™ which is manufactured by the company LEGRAND. This system allows the integration of a module to control the "scenarios" of switch-on or off of lights. That system is based on the use of electrical switches which can be remotely controlled by means of Powerline Communications (PLC) or by radio wave. . . . In practice, there is used a specific switch which is manually controlled or controlled by PLC or, alternatively, a specific box is combined with the conventional electrical switch for the purpose of achieving a manual switching circuit (via the switch positioned in front of the box) or by PLC. This system shows to be a significant solution for increasing the flexibility of remote control of electrical appliance and further shows the great interest of the manufacturers for improving home automation. However, such solution does not allow the design of a full and programmable solution of the different components and modules constituting the electrical panel in the house.

Another prior art solution is marketed by the company HAGER under the brand TeBis . . . . This solution is based on a set of communicating switches of bus output modules for controlling the lighting and achieve lighting and management of the distribution of electrical energy.

Communication between those elements is performed by radio or through a specific bus consisting of crossed wires allowing the transportation of a communication protocol called KNX. A special association process is performed by remote control in order to facilitate association between control switches and output models of lighting. The known TeBis solution is arranged for allowing communication of the control switches through an intranet network of the Internet network by means of a specific box which is a gateway allowing access to a pre-existing LAN . . . .

Although all those solutions provide significant improvement to home automation, and clearly show the critical interest of manufacturers for such field, it should be noticed that the known solutions do not integrate the IP protocol within the electrical energy distribution network. In the Tebis system marketed by company HAGER, only the gateway receives its own IP address which, by the way, is provided by an external router which is thus required. By no way, this system allows automatic distribution of IP addresses within the electrical energy distribution network and between the different components composing such network and, hence the implementation of a DHCP server at the heart of this network.

Furthermore, those systems require that significant modifications and work be brought to the electrical panel of the end-user because, on one hand, new cables and wires have to be incorporated (bus wires specifically) and new modules (in particular the said gateway) must have their housing in the main electrical panel.

U.S. Pat. No. 6,005,759 describes the organization of a network called DNP or Distributed Network Protocol within a distribution network of electric power with a series of substations, each having a LAN (Local Area Network). Again, this patent does not describe the organization of an architecture based on the IP protocol within a network of power distribution for a domestic installation.

Patent WO03058481 pursues further the realization of a network type DNP allowing the communication of information concerning local devices of power distribution and includes the setting of a standard Web server in such a network. Here too, the constitutive devices of the network of electric power distribution do not communicate through the use of the IP protocol, thus taking benefit of all the functionalities offered by such protocols. In addition, those realizations do not concern the installation of a domestic network at the end-user house.

Patent EP1062648 describes the realization of a remote access to electrical meters using the TPC/IP suite. This realization does not describe nor suggest the integration of TPC/IP protocol directly within the domestic network of power distribution and in particular in the different components or modules (circuit breakers, plugs, lights connections devices . . . ). In patent EP1062648, we notice in particular that meters communicate via a local network bus called CEBUS.

Solutions that have been just briefly described and discussed show interesting approaches for developing home automation for the end-user. Nevertheless, while all those prior art techniques clearly demonstrate the high interest shown by the manufacturers, those solutions remain complex and expensive and, moreover, leave the end-user totally dependent on the technical choices of one particular and "proprietary" architecture provided by one manufacturer, which is a serious disadvantage when it comes to achieve—and maintain—the installation of an effective and long lasting electrical energy distribution network.

The invention has for its objective to overcome these drawbacks.

SUMMARY OF THE INVENTION

It is an object of the present invention to fully and directly integrate the TPC/IP protocol within the domestic or industrial network providing distribution of electrical energy, and particularly the constitutive components of such network, such as circuit breakers, electric plugs, and devices of terminal connection . . . .

It is another object of the present invention to achieve communication between the elements and modules being constitutive of a home or industrial electrical energy distribution network, which significantly improves the flexibility and increases the functionalities of the network and its possibilities of future evolution.

It is another object of the present invention to achieve a device or electrical module to be installed in an electrical panel in the end-user power network, which jointly provides the functions of circuit breaker and those of a router according to the IP protocol.

It is another object of the present invention to provide a communicating switch intended to be integrated in the communicating network, which receiving its own IP address and which communicates with other constitutive elements or parts of the electrical energy distribution network, such as circuit breakers, electric plugs and sockets, and devices of terminal connection.

It is a third object of the present invention to achieve an electrical plug or socket, such as the standardized two phase+ ground socket or device (2P+T) which receives its own IP address and which communicates with other constitutive elements of the electrical energy distribution network, such as in particular circuit breakers, switches and terminal connection devices allowing connection of lights to the network.

It is a fourth object of the present invention to achieve a terminal connection device allowing connection, for instance, of a light to the electrical energy distribution network, which receives its own IP address and which communicates with other elements and modules composing the electrical energy distribution network, such as circuit breakers, electric plugs and sockets, and terminal connection devices . . . .

The invention achieves those objects by means of a process for communication between two modules or elements composing a—single phase or three-phase—electrical energy distribution network for a home or industrial premises, which includes circuit beakers, electrical modules, electric plugs, sockets and terminal connection devices, which process involves the following steps:

assign a first IP address, for example via a protocol such as DHCP, BootP or RARP, to a first constitutive element of the distribution network;

assign a second IP address, for example via a protocol such as DHCP, BootP or RARP, to a second constitutive element of the network of power distribution;

establish a communication between the said first and second element of the network of power distribution.

Therefore, and contrary to all the solutions known in the prior art, each electrical component which forms part of the electrical energy distribution network receives its own IP address. This results in the fact that the IP protocol is therefore incorporated at the heart of the energy distribution network. Thanks to the assignation of their own IP address, the two constitutive elements of the network of power distribution become perfectly communicative and it results multiple possibilities and additional functionalities.

In one particular embodiment, the IP addresses which are assigned to the constitutive parts or modules of the energy distribution network are assigned either manually or via a IP address assignment protocol such as DHCP, BootP or RARP.

In one particular embodiment, the assignment of one IP address is performed by means of a DHCP server which is located within a circuit breaker.

In one particular embodiment, the exchange of packets is achieved by means of at least one circuit breaker which integrates the function of router for performing the exchanges of packets between two different sub-networks.

In practice, there is achieved an easy evolution of one pre-existing energy distribution network simply by replacing two or more constitutive elements or modules within the existing installation. The communication of those elements in accordance with the process and protocols described below will thus provide the benefit of the new functionalities described below.

In one particular embodiment, the communication between the said first element and the said second element is achieved by Powerline Communication (PLC), which can be considered when two wires—including phase and neutral conductor—are available. Alternatively, in one second embodiment the communication between the said first element and the said second element is made by radio waves.

In a particular embodiment, the said first constitutive element is a switch and the said second constitutive element is an electrical socket, plug or outlet, for example of type two-phases and ground (2P+T), or a socket intended to enable the connection of a light bulb.

In one particular embodiment, the process further involves the step of communication with a circuit breaker, differential or not, which includes means for storing its own IP address and means for allowing a IP communication with other elements constitutive of the electrical energy distribution network.

It can be seen that the invention allows the communication of IP control commands and packets which are exchanged directly within the heart of the electrical energy distribution network, either directly through the wires (such as PCL) or by radio waves, by components of the electrical distribution network that are also IP clients and servers.

It results from what is preceeding that the electrical energy distribution network becomes able to take advantage of the significant possibilities and functionalities (what was clearly not allowed with prior art techniques) of the IP protocol and furthermore, and this is not a lesser advantage, become completely independent from suppliers and manufacturers of electrical components and modules for distribution network.

The process which is described below achieves the joint control, by means of one single switch, of different functionalities (heating and specific lighting control . . . ) so as to generate a <<scenario>> of switch-on and switch-off particularly easy to program.

Moreover, irrespective of the possibility which is given by the embodiments for controlling the switch-on and the switch-off of lighting and/or heating, the invention also provides communication between two particular elements or modules composing the electrical energy distribution network, thus allowing a wide variety of new functionalities.

For example, a circuit breaker can now communicate with connection devices or appliances connected to its own circuit, thus allowing statistical computations of the electrical consumption, or even the reporting of operating conditions or occurrence of operating errors . . . .

The constituents and elements which communicate to each other through their own IP address further receive the possibility to be accessible through an intranet network or the Internet network and, therefore, can be remotely controlled by the end user.

The invention achieves switches, sockets and plugs (such as two-wires plus ground 2P+T) and light connection devices for implementing the invented process.

In particular, the invention achieves a switch including:
  means for connection to the electrical wires composing a electrical energy distribution network;
  means for storing an IP address, such as provided by a DHCP server for instance;
  means for generating IP packets for the purpose of establishing an IP communication with other components of the electrical energy distribution network;

Similarly, the invention achieves a socket or plug, for example to embedded in the wall, comprising:
  a terminal block or board allowing the connection to the wires of an electrical energy distribution network;
  a connector for allowing the plugging of a plug;
  means for storing an IP address;
  means for generating IP packets for the purpose of establishing an IP communication with other components of the electrical energy distribution network;

The communication with IP packets or IP datagram can enable to control the socket 2P+T which becomes then a controlled socket.

The invention allows also realizing a light connection device consisting of:
  a terminal block or board allowing the connection to the wires of an electrical energy distribution network;
  a connector to allow connecting a light;
  means for storing an IP address;
  means for generating IP packets for the purpose of establishing an IP communication with other components of the electrical energy distribution network;

The invention allows also realizing an electrical lamp holder comprising:
  a circuit board for the connection to the wires of an electrical energy distribution network;
  a base for receiving a lamp bulb
  means for storing an IP address;
  means for generating IP packets for the purpose of establishing an IP communication with other components of the electrical energy distribution network;

The invention realizes a circuit breaker for an electrical board or panel consisting of:
  an input terminal block or board allowing the connection of at least two conductors, for example PHASE conductor and NEUTRAL conductor;
  an output terminal block or board protected with at least two conductors;
  communication means for storing an IP address and the exchange of IP packets through the electrical network with other modules of the said network.

There is therefore achieved a circuit breaker which can communicate through the IP protocol, thus opening the door to many possibilities and new functionalities.

In one particular embodiment, the circuit breaker includes a DHCP server, possibly disengaged, allowing assigning according to a protocol such as DHCP (Dynamic Host Control Procedure) IP addresses (IPV4 or IPV6 for example) to the different elements composing the electrical energy distribution network.

In one particular embodiment, the circuit breaker integrates a router which is fitted with means for storing routing tables, for the purpose of routing IP packets generated from and transmitted to the communicating components belonging to a sub-Local Area Network (LAN).

In one particular embodiment, the circuit breaker comprises means for simultaneously performing the routing functions required by all the existing sub-LAN networks, so that one single circuit breaker achieves the routing function for the whole electrical energy distribution network.

In one particular embodiment, the circuit breaker involves a stand-by mode wherein the routing functions are deactivated so as to allow another circuit breaker to act as the main router . . . . In case of a breakdown on that main router, the routing functions of the circuit breaker may become active to achieve continuity in the routing functionalities within the electrical energy distribution network.

In a particular embodiment, the circuit breaker integrates a removable electronic circuit which can be easily replaced in case of breakdown so as to achieve easy maintenance of the electrical energy distribution network.

DESCRIPTION OF THE DRAWINGS

Other characteristics, goal and advantages of the invention will appear when reading the description and the drawings here below, provided only as non limiting examples. On drawings in annex.

DESCRIPTION OF A PREFERRED EMBODIMENT

In the following description, numerous details which appear are provided to illustrate a specific embodiment of the invention. A skilled man however, may make special arrangements depending on the architecture proposed or on the electronic components to be selected to implement the process of the invention. He will observe that the procedure of invention and arrangements for implementing the procedure are achievable regardless of specific details or methods and particular processes described below. In other respects, specific details of implementation of some components of the communicating electrical energy distribution network, in the scope of a skilled person, will not be described in order to avoid too lengthy a description.

The reference to a so-called "embodiment of the invention" through the description means that a particular feature which is exposed in the body of the corresponding paragraph is at least in a particular achievement. Therefore, the multiple references to an "embodiment" that the reader is likely to come across in various parts of the body of the description do not refer to a same embodiment, and the corresponding requirements may, at the choice of the skilled man, advantageously be combined or considered separately.

Figure 1A:
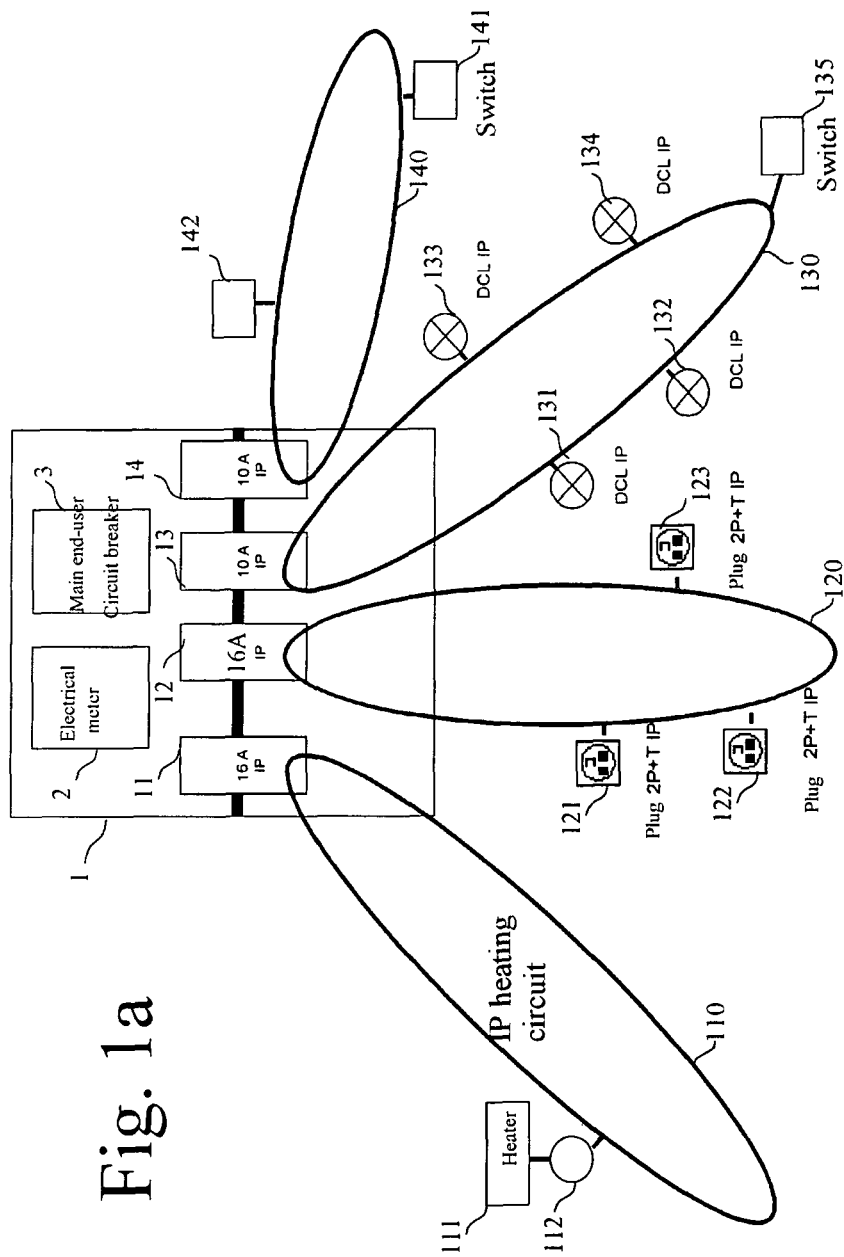
FIG. 1a illustrates a general architecture of an electrical energy distribution network in accordance with one embodiment.

FIG. 1a illustrates a general architecture of one embodiment of one communicating electrical energy distribution network. For the sake of clarity, it will be considered the example of a single phase two wires network and, clearly, the skilled man will straightforwardly adapt the teaching of the invention to a three-phase network.

The illustrated network—voluntarily simplified to ease the understanding of the embodiment, is made of an end-user electric panel or board 1 of type single-phase, possibly, an end-user electrical meter 2 and a main differential circuit breaker 3 installed by the national operator—or by one of the national operators—which distribute electrical energy in the country. It should be noted that, most of the time, meter 2 is delocalized outside of the end-user home.

The end-user electrical board or panel further comprises a set of communicating circuit breakers 11, 12, 13 and 14 respectively used for protection against overloading of circuits 110 120, 130 and 140.

For clarity and convenience of the explanation, the communicating circuit breaker 11 is a differential circuit breaker of 16 Amps, protecting a heating circuit 110 made of an electric cable with a section of 2.5 mm2 and feeding a heater 111 via a connection device 112.

Similarly, the circuit breaker 12 is a second differential circuit breaker of 16 Amps protecting a circuit 120 consisting of a set of communicative electrical sockets or plugs (2P+T, such as two-wires+ground wall plugs) 121-124, which will be described here after.

Circuit breaker 13 is a third differential circuit breaker of 10 Amps protecting a lighting circuit 130 consisting of a set of light connection devices (DCL) 131-134, and a first communicating switch 135.

Circuit breaker 14 is a fourth differential circuit breaker of 10 Amps protecting a lighting circuit 140 consisting of a second communicating switch 141 and a light connection device (DCL) 142.

As we can see, the architecture of the communicative network in accordance with the invention is entirely consistent with a conventional cable installation, except that we replace the conventional elements such as circuit breakers, plugs/sockets, switches and light connecting devices (DCL), with the versions that will be presented below.

Regarding the wiring, it should be noticed that the skilled man will take great care of the conventional safety rules which particularly define the electric cable sections which are to be used in accordance with the particular appliances to connect to the distribution network, as well as the organization of cables in number of independent <<circuits>> according to the number of apparatuses to connect (heating, lights, electrical oven etc. . . . ). in addition, and in order to clarify the explanation of the invention, we will leave aside considerations related to standardization, well known by a skilled man and that are fundamental in terms of safety.

In the electrical energy distribution network which is described hereinafter, all elements of the network, such as circuit breakers 11-14, electrical sockets 121-123, lights connection devices (DCL) 131-134 and 142, as well as switches 135 and 141 are fitted with electronic circuits which allows the receiving and the storing of an IP address in accordance with the IP protocol and, thus, become perfectly communicating within the network.

In one embodiment, those IP addresses are assigned via a DHCP server which is incorporated within the end-user circuit breaker 2, thus serving as a gateway to the Internet network, opening the possibility for the national energy provider—for example company EDF in FRANCE—to easily become an Internet Service Provider (ISP), authorizing, as we will see later, a variety of new functionalities for the household appliances connected to the network.

Thanks to the assignment of their own IP address, two constitutive elements composing the electrical energy distribution network become perfectly communicating and, and contrary to the prior art solutions, may take advantage of the huge possibilities and advantages provided by the TCP/IP protocol and functionality. For instance, thanks to this particular IP address which is assigned to every element composing the electrical energy distribution network, it becomes possible to use the richness of IP protocols, such as PING for example to test the access to an element. Moreover, elements such as a switch or a light connecting devices become able to communicate without restriction, and are thus likely to be associated together, thus enabling effective programming of switch-on or switch-off scenarios of a light connected to the light connection device through the switch. Moreover, as soon as a third element receives it own IP address in accordance with the process described hereinafter, for example a new switch being located in another room in the premise or the building, the light connection device can then be also <<associated>> to this new switch. This therefore achieves, in a very easy way, the setting up of a light which can be controlled by two different switches located in two different areas (<<up and down>>). In addition, such arrangement does not require any significant modification in the wiring of the electrical energy distribution network since such new functionality can be brought by simply replacing the two switches and the light connecting device by the "communicating" versions in accordance with the present invention. Similarly we could easily realize a <<timer>> function controlled by the combination of a switch and a communicating socket in accordance with the invention.

It will be immediately noticed that any existing electrical energy distribution network—either a home network or an industrial network—can easily evolve to provide new functions. This is simply achieved by substituting at least two elements without modifying the existing wiring of the distribution network.

Then the end-user may, as it will be apparent with hereinafter described association process between two communicating elements, replace one already existing switch and light connection device by a set of two new communicating components, including a communicating switch and a communicating light connection device (DCL) in accordance with the present invention to obtain, without further delay and without significant modification of the electrical energy distribution network, the possibility to switch-on or off the light by means of a switch set in another position than the usual position.

Furthermore, the process which is described below allows a user to avoid the need to set up a specific Ethernet wiring because it will be possible, and this will be particularly apparent with the second embodiment which is described hereinafter, to directly incorporate, within the "heart" of the electrical energy distribution network, an architecture allowing full communication between any element composing such network. In particular, any household appliance connected to the electrical network may become one communicating element being integrated to the distribution network and can take advantage of the wide possibilities offered by the electrical energy distribution network in accordance with the invention. Indeed, the connection of such appliance to the electrical energy distribution network achieves, simultaneously, the provision of the electrical energy required for its working as well as the necessary parameters (IP address, network mask and IP address gateway) required for allowing full range communication.

The process of the invention achieves an effective and advantageous combination of the supply of electrical energy with communication capability with the other components of the electrical energy distribution network, and even with the Internet network. This effective communication, and this is an advantageous aspect of the process described, is achieved in a way which is totally transparent to the end-user. Indeed, unlike already known systems, for example the TeBis procedure from HAGER, it is not needed for the end-user to invest in the establishment of the network, in particular to introduce a "gateway" in its electric panel, to enable the communication via the Internet network.

With the invention, each element composing the electrical energy distribution network, such as switches and light connection devices (DCL), automatically receive an IP address from a DHCP server located in the circuit breaker and therefore the possibility to communicate with other elements without requiring any particular involvement from the end-user. In most cases, the end-user will not need to be informed of the existence of these new features that will provide additional comfort and ease without the need to worry about the "origin" or the technical means implemented to ensure these new functionalities.

Thus a device, for example an appliance like a dishwasher that the end-user will connect to the network through its plug, will automatically receive via its electrical socket the configuration parameters (IP address, network mask and IP address of the gateway) required for launching a communication via the Internet network, and in particular toward the maintenance servers of the manufacturer.

As we can see, the invention has for advantage to make totally useless any other means for accessing to the Internet Network, in particular based on a subscription to a specific access provider. Moreover, the invention does not require the establishment of any wireless network (such as 802.11 WIFI network) to allow the communication via the Internet network because, at every point of the subscriber's home, a domestic apparatus receives simultaneously its electric power and the technical means (including IP settings) for achieving a communication with the Internet network.

In addition to that connection to the INTERNET network, it should be noticed that, and that is already a significant advantage of the present invention, two particular elements composing the electrical energy distribution network can fully communicate, thus allowing the association procedure described hereinafter.

Figure 1B:
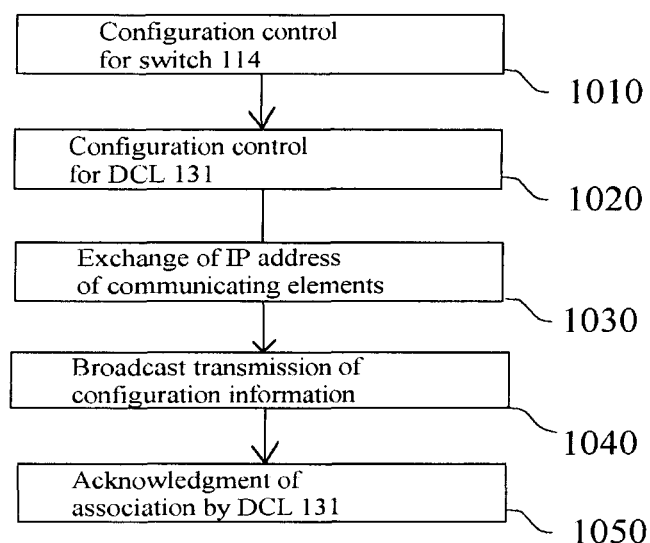
FIG. 1b illustrates an example of association procedure of a switch with another communicating component, such as a light for example.

FIG. 1b illustrates an example of one association procedure between a switch communicating with another element, such as a light for example.

The process starts with a step 1010 corresponding to the entering into a so-called "configuration" mode by switch 114. In one embodiment, such configuration mode is started after, for instance, a series of ten switch on-switch off controlled by the user, thus resulting in the switch entering into the configuration mode.

The process then proceeds with a step 1020, wherein the second communicating component—such as a light connection device (DCL) 131—is set in a similar "configuration" mode. This can be done, for instance, by any particular arrangement, such as a specific push button controlling the entering into the configuration mode.

In a step 1030, the two elements exchange their IP addresses for the purpose of generating an association between them.

Optionally, in a step 1040, information of association are transmitted by broadcast to the electrical energy distribution network in order to allow a backup of this association in one or several central points.

In a step 1050, the process proceeds with the acknowledgment or the confirmation of the association being performed, for example by the control of a flashing lighting.

This carries out, in a simple and effective way, an association between one particular switch and one particular light connection device (DCL). By using successive association procedures, the end-user may thus generates and setup the functionalities required to personalize his own electrical energy distribution network. Any number of communicating elements may thus be associated.

Thanks to this association procedure and of the fact that each element of the electrical energy distribution network receives its own IP address, one may control any element composing the network by means of another element. It should be noticed that, in particular, it is even feasible that switch 141—installed in the electrical circuit 140—controls the switching-on or the switching-off of light 131 which is arranged in the electric circuit 130.

This significant advantage is made possible because the invented process results in the distinguishing between, on one hand power circuits that distribute and supply the electric energy and power which is shared between the different circuits (e.g. circuit 110, 120, 130 etc. . . . ) individually protected by their associated circuit breaker (e.g. 11, 12, 13 etc. . . . ) and, one the other hand, the <<control>> part which is based on the transport of IP packets—possibly via electric cables and through communicating circuit breakers, to command the switching-on or off of the lights.

Figure 2:
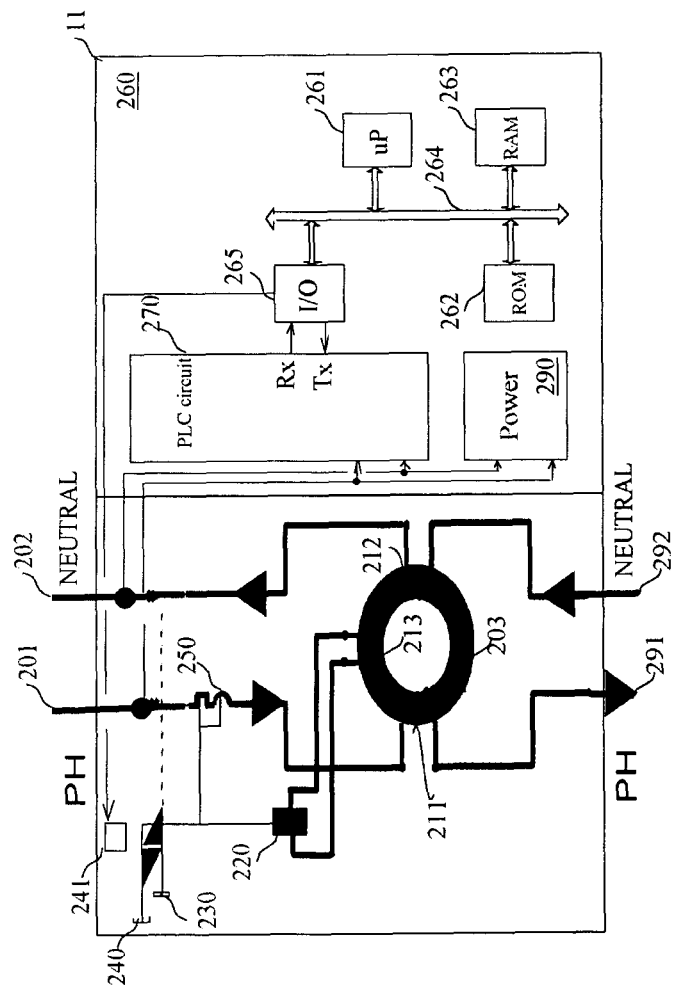
FIG. 2 illustrates a schematical diagram of one embodiment of a circuit breaker.

FIG. 2 illustrates the schematic diagram of one embodiment of a circuit breaker, such as circuit breaker 11 for example, which can communicate with other components of the electrical energy distribution network.

In general, circuit breaker 11 includes the classical elements of a circuit breaker of an electrical board, differential or not, consisting of a terminal input for the two main poles PHASE and NEUTRAL and a terminal output made of poles 291 and 292 for the utilization. Circuit breaker 11 includes also a magnetic torus 210 with three coils that are a phase coil 211, a neutral coil 212 and a detection coil 213. The detection coil 213 is used to feed an electro-magnet 220 allowing activating a trigger 230 allowing opening the phase circuit. A trigger button 240 allows resetting the circuit breaker for repositioning it in normal operation mode. A triggering device 250 magneto-thermal complete the "circuit breaker" of the device 11.

Phase and neutral coils are used to circulate a magnetic flow within torus 203 which, in principle, cancel each other in normal mode of operation. In an abnormal situation, when the two currents of phase and neutral are not equal, the detection coil detects a residual flow which allows then the activation of the electro-magnet 220 and, then, the trigger of the circuit breaker.

It should be noted that FIG. 2 only illustrates one possible example of one circuit breaker and that the skilled man may clearly adapt the teaching of the invention to the realization of other embodiments.

Communicating circuit breaker 11 includes, in addition to its functional part <<circuit breaker>>, an electronic circuit 260 which, in one particular embodiment, is a removable part—just as the conventional "fuse" of the past—so as to facilitate replacement in case of dysfunction.

The electronic circuit 260 includes a micro-processor 261 equipped with volatile and non volatile memory for the purpose of storing data and micro program instructions. FIG. 2 illustrates the example of a RAM type memory 263 and a ROM type memory 262 which communicate with microprocessor 261 via a bus 264. It should be noted that a skilled man may indifferently opt for other types of memory type EEPROM, FLASH etc. . . . . . An input output unit I/O 265 allows the communication between the processor and external elements, and in particular a control device of relay 241 allowing control by software, where appropriate, the trigger of the circuit breaker, and also a Powerline Communication (PLC) circuit allowing a bi-directional communication via the phase-neutral circuit.

The PLC circuit 270 is a powerline transceiver which is well known to the skilled man and, for the sake of clarity, will not be further developed. It suffices to say that such device generally includes electronics coupling circuits for transmitting and for receiving, respectively, Tx and Rx data on phase and neutral conductors by means of a carrier modulation, such as a FSK type (Frequency Shift Keying) modulation for instance. The reader is invited to refer to the specifications of manufacturers of integrated circuits. An example of a circuit allowing the broadcasting and transmission-type FSK is given in the document from the company STMICROELECTRONICS SA with the reference ST5740 FSK POWER LINE TRANSCEICER—DESIGN GUIDE FOR AMR, which can be found at the following URL:

http://www.st.com/stonline/products/literature/an/12791.htm

It should be noticed that, in particular, known PLC circuits are in general arranged to allow the simultaneous and optimal operation, on a given circuit line, of fifteen PLC. It should be noted that this number is not an absolute limit and that a skilled man can clearly increase such number through straightforward specific adaptations.

Electronic circuit 260 further includes a powering circuit 290 supplying DC current from the AC current which is transported through the PHASE and NEUTRAL wires. In one embodiment, the powering of circuit 290 is taken directly upstream of the magneto thermal triggering device 250. In one particular embodiment, circuit 290 incorporates a battery unit being normally charged by the electricity network, so as to enable maintaining the operation of the intelligent part of the circuit breaker even when the latter is in a trigger state and has disconnected the protected downstream circuit from the network.

In the diagram shown in FIG. 2, an alternate embodiment is shown where supply circuit 290 is connected on the PHASE and NEUTRAL wires, at a position being downstream with respect to the magneto thermal triggering device so as to maintain functioning of the control logic of circuit 260 even when circuit breaker has been triggered.

The electronic circuit 260 of circuit breaker 111 includes in its memory or ROM 262, in addition to the instructions of the micro-program allowing to set the procedures here after described, a MAC address (MEDIA ACCESS CONTROL), allowing to identify in a unique manner the electronic circuit. As we will see later, that MAC address is used during configuration phases when the circuit breaker 11 is turned on, before the assignment of the IP address.

Non volatile memory allows storing IP address and routing tables of the elements constitutive of the domestic or industrial network, in order to allow circuit breaker 11 to keep a <<copy>> of overall configuration parameters, together with the association tables (switches—light connection device DCL) also stored in the other circuit breakers.

In a particular embodiment, in order to ease the maintenance of the network, circuit breaker 11 includes an integrated WEB server being able to access a memory (not represented) allowing storing tables of MAC or IP address IP of the components of the electrical distribution network which will be described here after.

Figure 3:
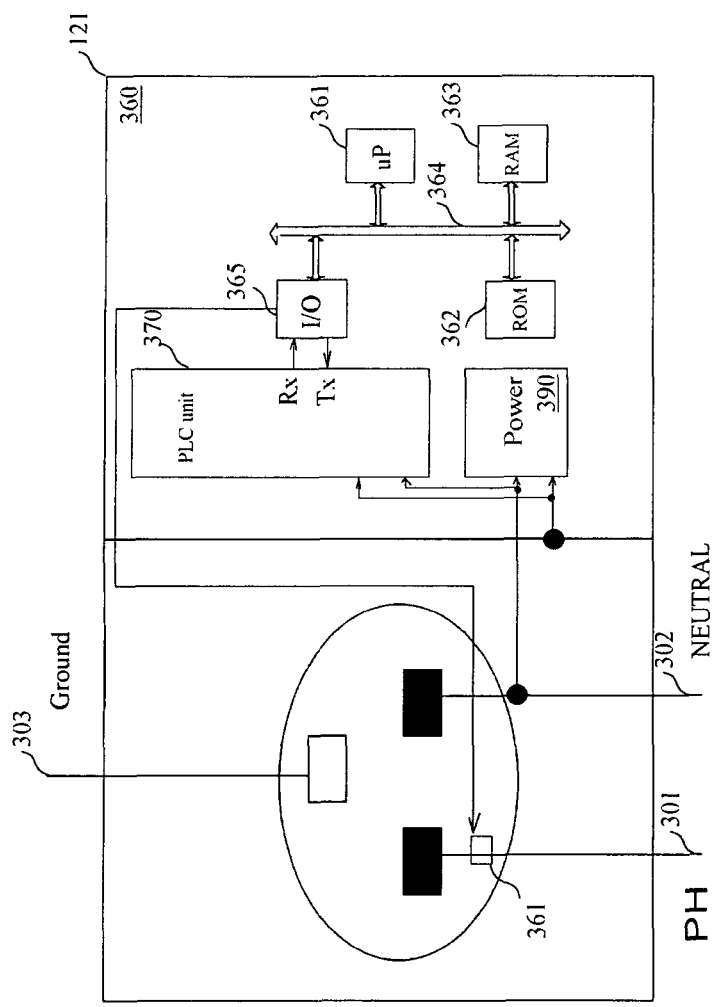
FIG. 3 illustrates one basic diagram of an electric socket or plug, such as a two-wires plus ground, in accordance with one embodiment.

FIG. 3 illustrates an embodiment of a wall plug 121 of type 2P+T (two phase+ground) allowing the electrical connection of a household appliance. The device includes a terminal block with the two poles PHASE and NEUTRAL, respectively 301 and 302, and including in addition a terminal block for the grounding conductor 303. In a particular embodiment, the plug includes a switch or relay 361 controlled by a circuit 360 and possibly and susceptible to disconnect the pole of phase in order to disconnect, by software, the connected domestic appliance.

Plug 121 includes moreover an electronic circuit 360 including an architecture similar to that already described for the circuit breaker, and which will, therefore for the sake of conciseness, be quickly discussed.

Electronic circuit 360 includes a micro-processor 361 which communicates via its internal bus 364 with a RAM memory 363 and a non volatile memory 362 (ROM or EEPROM), as well as an input/output unit 365 allowing the control, via the processor, of the switch 361 but also the communication with the PLC unit 370 similar to the unit 270 described in FIG. 2.

Electronic circuit 360 includes also a power supply circuit 390 generating DC current from the current extracted from PHASE and NEUTRAL poles. In one embodiment, a rechargeable battery may be arranged in order to supply current to the internal control logic (including processor 361) when the PHASE and NEUTRAL poles are disconnected from the electrical energy distribution network because of the triggering of circuit breaker 12 of FIG. 1.

Similarly to circuit breaker 11, the wall plug 121 includes in a ROM memory 362 a MAC address which identifies the electronic circuit 360, and further includes means for storing an IP address which is likely to be assigned by a DHCP server from one of the communicating circuit breakers 1, and 11-14.

Figure 4:
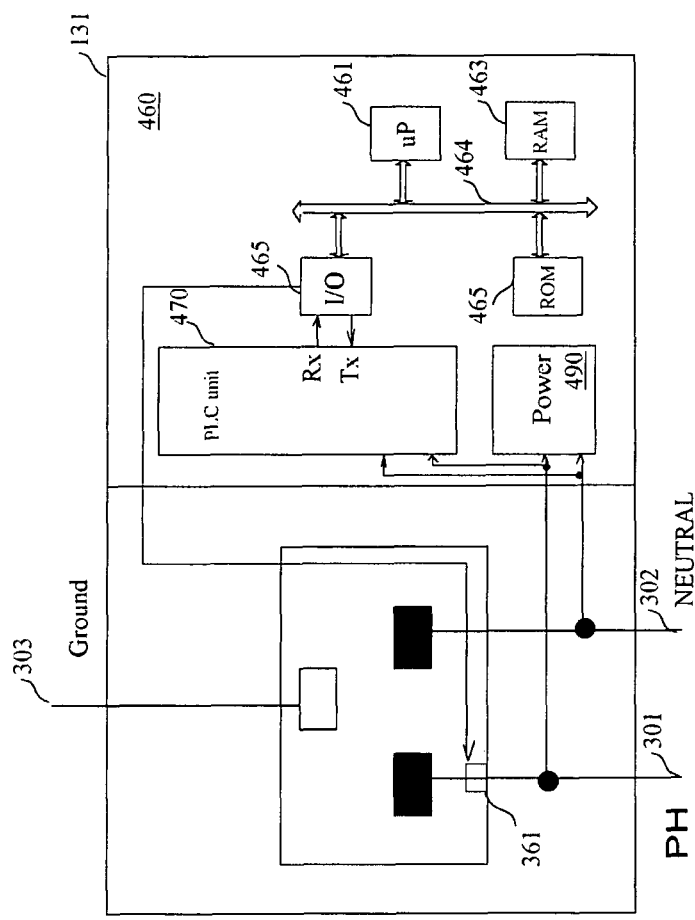
FIG. 4 illustrates one schematical diagram of a embodiment of device of terminal connection in accordance with the invention.

FIG. 4 illustrates an embodiment of a light connection device (DCL) 131 allowing connection of a light to the electrical energy distribution network. It can be seen that, again, the light connection device has a functional architecture which is similar to the one described above for the wall plug or socket. FIG. 4 shows the PHASE, NEUTRAL and GROUND poles 401, 402 and 403, respectively, with a switch or relay 461 controlled by an electronic circuit 460 allowing disconnecting the PHASE from the electrical network.

Electronic circuit 460 of the light connection device DCL 131 includes, similarly to the circuit breaker 110 and to the plug 2P+T 121, a microprocessor 461 which communicates via a bus 464 with a volatile RAM memory 463, together with a non volatile memory 462 allowing to store a MAC address as well as an IP address, and an input/output circuit 465 allowing in particular to control relay 461 and a full duplex communication with the Powerline Communication unit PLC 470. A Power supply unit or circuit generates the appropriate DC current to the components forming part of the electronic circuit 460 and may, as for the previous circuits, be equipped with a rechargeable battery.

In a particular embodiment, the light connection device 131 is embodied under the form of standard socket—to cap or bayonet—allowing implementing the procedure in accordance with the invention even in the oldest installations. More particularly the socket includes A cap allowing to connect an electric light bulb, the said cap receiving two conductors respectively phase and neutral, A controllable switching device for disconnecting the light bulb from the phase and/or neutral wire, A control unit powered by the phase and neutral conductors and including electronic circuitry for the purpose of storing an IP address and further allowing IP communication for the purpose of exchanging messages for controlling the switch on or switch off of the light bulb connected to the socket.

Figure 5:
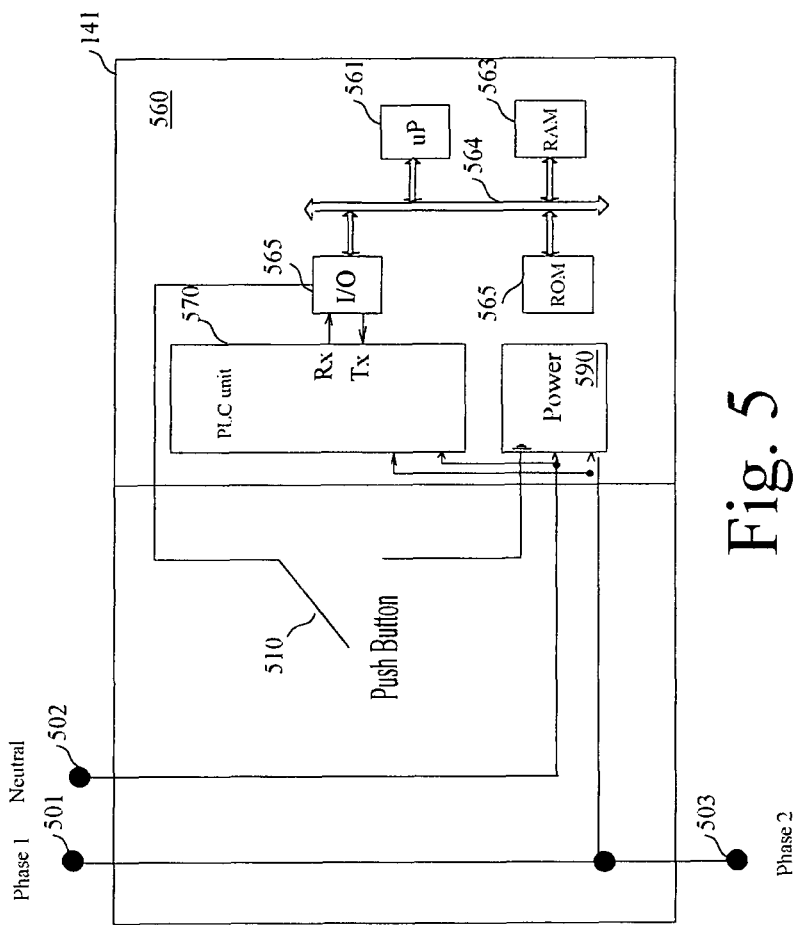
FIG. 5 illustrates the schematic diagram of a switch module according to an embodiment of the invention.

FIG. 5 illustrates one embodiment of a switch 141 which can communicate with other components of the electrical energy distribution network. The switch includes a terminal of phase 501 and a terminal of neutral 503. Optionally, the switch may include an additional terminal to allow the connection of a second electric cable in order to allow a direct replacement of an already existing simple switch by a communicating switch in accordance with the invention. A skilled man will observe that the two terminals of phase are connected internally in order to allow the direct transit of electrical current whatever the position of the pushbutton 510.

The communicating switch 141 includes an electronic circuit 560 including a micro-processor 561 communicating via a bus 564 with a volatile memory RAM 563, and with a non volatile memory 562 allowing to store a MAC address and also an IP address, and an input/output circuit 565 allowing a full duplex communication with the PLC unit 570. A feeding circuit 590 generates the needed supply current to electronic circuit 560 and may, as for the previous circuits, be equipped with a rechargeable battery.

Switch 141 which is illustrated in FIG. 5 is designed to be connected to the two poles phase and neutral, which are in principle present in the embedded wall box. It may happen however that in an already existing installation, the box which is housed in the classic switch does not include the neutral conductor.

To allow nevertheless the replacement of a conventional switch, there is provided, in one embodiment of the process of the invention, one switch being powered by a battery which communicates by means of radio waves. As for circuit breaker 111, the electronic circuit 560 of switch 141 is removable allowing the replacement of the adequate electronic part (susceptible to break down) and/or the refill of the internal battery.

It can be seen that all elements composing the electrical energy distribution network include an electronic circuit, respectively 160, 260, 360, 460, 560, for the purpose of storing a MAC address, but also the IP address assigned by the DHCP server operating within the network, and the implementation of configuration, initialization and association procedures which will be described here after.

In general, all electronic circuits are implemented by means of hardware control logic and preferably based on microelectronics circuits including microprocessors controlled by software micro programs, and any combinations of hardware circuits and software implementations.

The components which were described above can be clearly combined in various ways in order to carry out a home or industrial electrical energy distribution network.

To illustrate the great number of applications which are made possible by means of the invention, there are now illustrated two particular embodiments providing significant advantages over the prior art techniques and illustrating the great flexibility of the process invented.

I. First Embodiment

The first embodiment which is described and discussed below is particularly adapted to the implementation of the invented process to a "basic" installation for the purpose of achieving a home electrical energy distribution network, taking advantage of new functionalities resulting from the capability of communication of the device, modules and components constituting the communicating electrical energy distribution network described above.

Figure 6A:
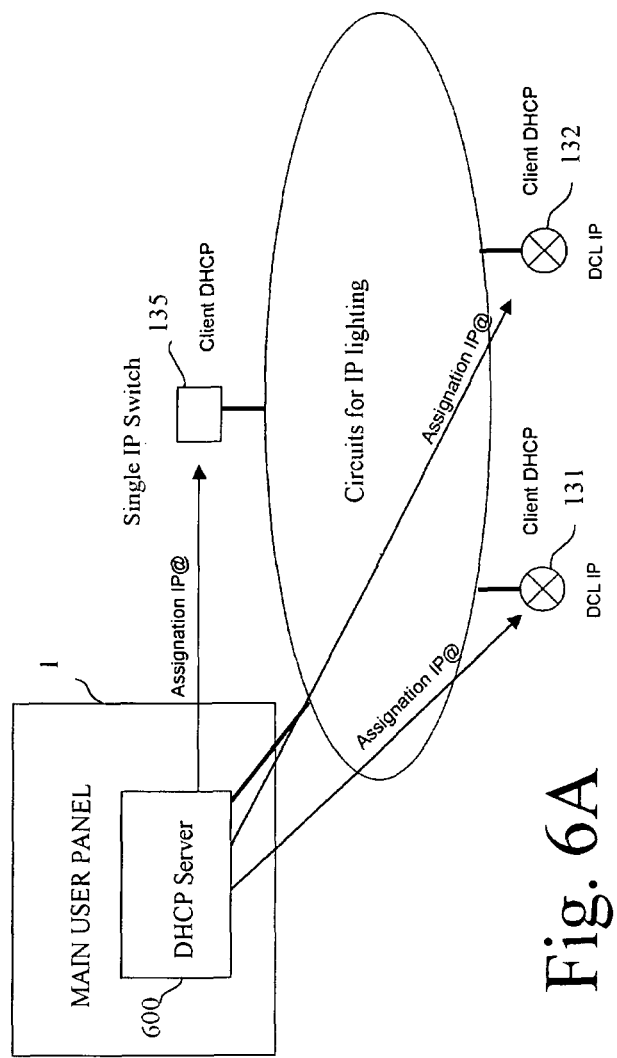
FIG. 6A illustrates a first embodiment corresponding to the organization of all the communicative elements within a unique LAN network and the IP assignment by a DHCP server positioned in the main circuit breaker.

FIG. 6A illustrates this first embodiment in which the electrical network, in its entirety, is a unique LAN network where all constituents have their own IP address and can thus communicate with any other component of the network.

In this first embodiment, each component (circuit breaker, two-wires+ground plug 2P+T, light connection device DCL etc. . . . ) gets its IP address through a protocol of address assignment. In a particular embodiment, the assignment of the IP address complies with the following protocols used for routers, that is the RARP protocol (Reverse Address Resolution Protocol) or BootP (BootStrap Protocol) or also, in accordance with a preferred embodiment, the DHCP protocol (Dynamic Host Configuration Protocol). For more information about such IP address assignment protocols, it is suggested to refer to telecommunication books dealing with the subject of addressing in routers and in particular to the book <<INTERNET WORKING WITH TCP/IP—Volume I: Principles, Protocols and Architecture>> by Douglas E. Corner, Prentice Hall International Editions, 3rd Ed., 1995, ISBN 0-13-216987-8, or also <<TCP/IP Illustrated Volume 1, The Protocols>>, by W. Richard Stevens, ADDISON-WESLEY PUBLISHING COMPANY, 1994, ISBN 0-201-63346-9.

To that purpose, the electrical energy distribution network comprises one particular component which embodies a server according to the selected protocol, ie DHCP, BootP or RARP as the case may be.

In one particular embodiment a DHCP server will be present in a device simply connected to the electrical network, installed for example in a specific modem router providing the access to the Internet network. It should be noted that such a modem will, compared to known modem routers, have a PLC interface for the purpose of exchanging IP packets directly through the electrical energy distribution network.

Alternatively, the DHCP server may advantageously be embodied in the main circuit breaker connected to the national provider of electrical energy, as illustrated in the FIG. 6 which shows that the end-user board or panel 1 includes at least one circuit breaker which integrates a DHCP server 600 providing the assignment of IP address as soon as a new element—designated DHCP client—requests it.

Alternatively, when the local provider does not provide such service, one of communicating circuit breakers 11, 12, 13 or 14 as described above will fulfill the role of DHCP server.

In order to avoid the collision between several DHCP servers located in several circuit breakers present in the electrical panel, each circuit breaker is arranged with an activation procedure or de-activation procedure of its integrated DHCP server in order to avoid possible collisions between the two servers of the two distinct circuit breakers.

Figure 6B:
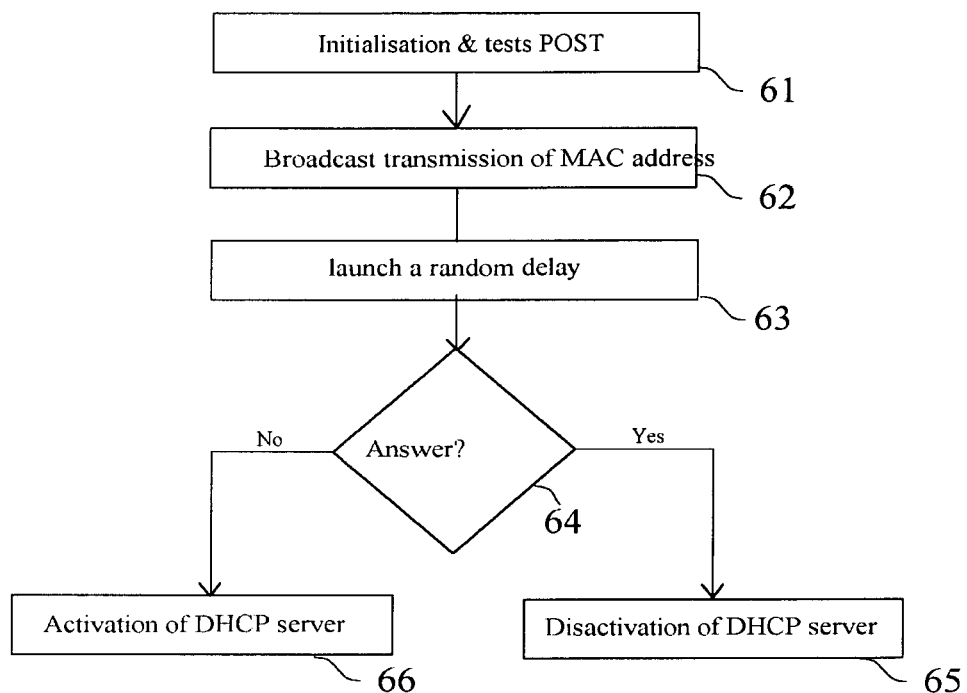
FIG. 6B illustrates the activation-deactivation procedure of the DHCP function when this one is included, not in the main circuit breaker as illustrated in FIG. 6A, but in the divisional breakers of end-user board.

Such mechanism is illustrated for example in FIG. 6B which shows a procedure including the following steps implemented at the startup of the communicating circuit breaker, for example circuit breaker 14.

The procedure includes a first step 61 where the electronic circuit 260 launches an internal test procedure after startup (Power-On Self Test)

Then, in a step 62, the communicating circuit breaker 14 transmits its own MAC address in BROADCAST in order to communicate this address to each element of the network of electricity distribution.

In a step 63, the communicating circuit breaker 14 starts a temporization with a random delay. The use of the random delay guarantees that only one communicating circuit breaker will activate its own DHCP server even when the end-user switches-on all the circuit breakers at the same time.

In a step 64, the communicating circuit breaker 14 performs a test to check the answer to its DHCP request.

If an answer has been received before the expiration of the planned delay in the temporization of step 63, then the communication circuit breaker de-activates its own DHCP server in a step 65.

In the opposite case, the procedure goes to step 66 where the circuit breaker put into service its own DHCP server.

Thus we guarantee that one DHCP server works in a transparent way for the end-user who does not have to worry about creating a subordinate LAN network, as that was the case with one particular prior art technique (TeBis system from company HAGER).

There is now described a second embodiment which is even more advantageous since, besides the DHCP function, each circuit breaker integrates in addition a routing function.

II. Second Embodiment

Figure 7:
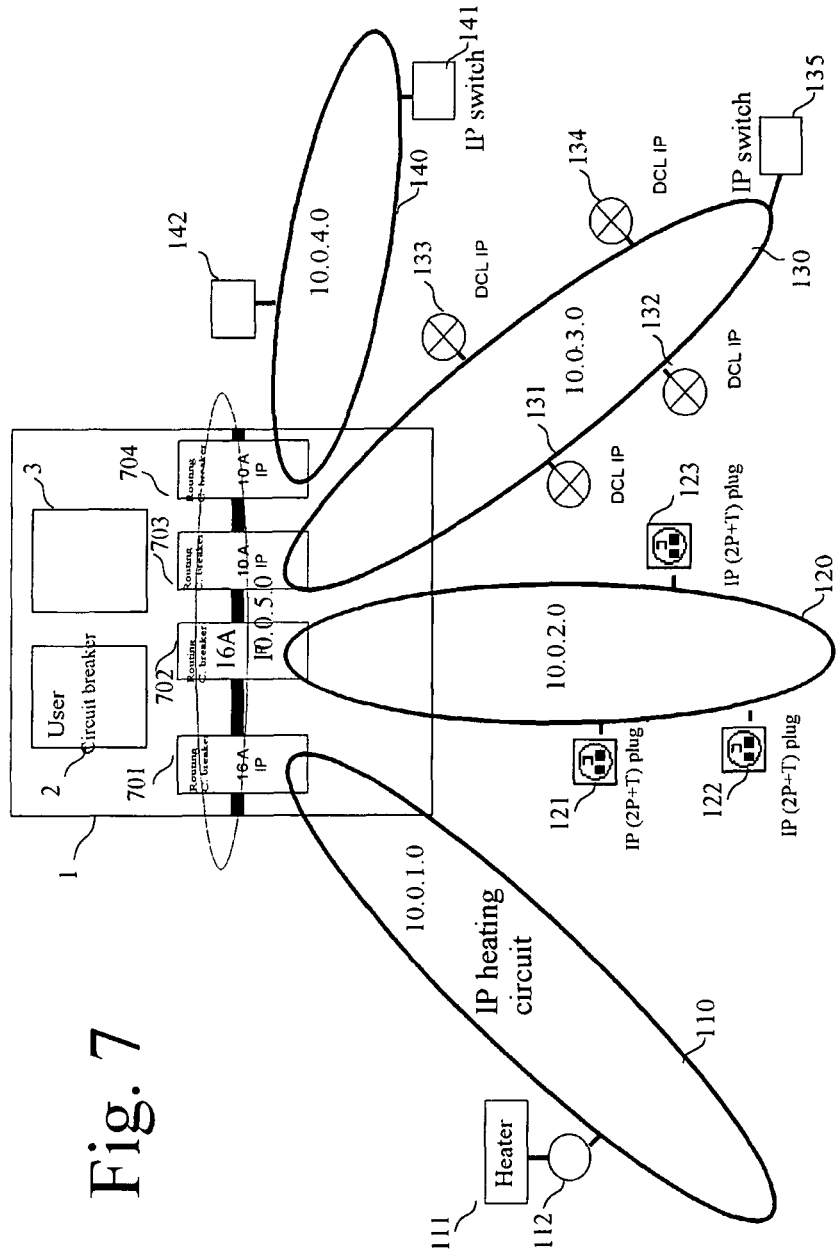
FIG. 7 illustrates a second embodiment where circuit breakers are routers.

FIG. 7 illustrates a second embodiment more advantageous and sophisticated which is particularly suited to complex installations, such as industrial installations.

Indeed, in complex installations, the number of components of the electrical network can become very important and, therefore, difficult to manage for the end-user.

Moreover, it can be desirable to improve the possibilities of control of the different components constituting the electrical energy distribution network and, for that purpose, it may be desirable to divide one given energy distribution network in sub-systems or sub-networks, each corresponding to one circuit line or to a set of circuit lines for example.

One embodiment of the present invention allows, and this is a significant advantage, to divide and share the energy distribution network (because it is only made of two conductors PHASE and NEUTRAL in the case of a single-phase network) so that it no longer corresponds, as it is the case in the first embodiment previously described, to one single and unique LAN, but to a combination of LAN sub networks, which may advantageously—but not exclusively—correspond to the line circuits.

It then results, as explained hereinafter, in an easier management of the electrical energy distribution network but also multiple possibilities and new functionalities, in particular in terms of security.

The invention allows realizing this division of the network as it can be seen with the example of FIG. 7.

FIG. 7 shows that each line circuit is organized in order to match to a LAN (Local Area Network) with its own range of private IP addresses. Circuit 110 matches so to network 10.0.1.0; circuit 120 matches to network 10.0.2.0; circuit 130 matches to network 10.0.3.0; circuit 140 matches to network 10.0.4.0, etc. . . . .

Furthermore, the circuit breakers which are located in the electrical board or panel, e.g. circuit breakers 701-704 of FIG. 7—now incorporate a routing function for allowing the transit of packets or IP data from one sub-network to another, and are themselves organized within a specific LAN, such as for example 10.0.5.0 in FIG. 7, in order to create a core network whose function will be to route packets from one circuit to a second circuit and, moreover, allowing to transmit IP packets of the network elements to the INTERNET network, and vice versa, to transmit IP packets from the Internet directly within the electrical circuits.

Alternatively, all routing functions implemented in the different sub segments, may be concentrated in a unique circuit breaker-router, which will include a processor and software allowing instantiation of several routers.

In order to simplify, elements of FIG. 7 which are already known with those is illustrated in FIG. 1 have the same references.

Thus circuit breaker-router 701 protects circuit 110 including the radiator or heater 111 and connection device 112; also, circuit breaker-router 702 protects the line circuit 120 communicating including electrical plugs 2P+T 121-123; circuit breaker-router 703 protects circuit 130 including the light connection device (DCL) 131-134, and the communicating switch 135; and finally, the circuit breaker-router 704 protects the line circuit of lights 140 including the second communicating switch 141 and the light connection device (DCL) 142.

In practice, it should be noticed that the circuit breaker-routers may be advantageously realized according to the architecture described in relation with FIG. 2. To this end, the non volatile memory (EEPROM or FLASH) 262 can integrate the routing tables allowing to exchange IP packets between the different LAN circuits. Moreover, these routing tables will be built either manually, or dynamically and, in this particular case, through a routing protocol of type RIP (Routing Information Protocol) whose specification may be found in the RFC 1058 (Hedrick 1988). Briefly, these routing tables include the IP address of the destination network and the IP address of the <<next-hop>> router on the path to the destination network.

The architecture of this second embodiment previously described achieves a high flexibility in the control of an electrical distribution network and in the supply of a large number of features that become possible.

Firstly, the second embodiment achieves an address process which clearly facilitates the tracking and identification of various elements and components forming parts of the electrical energy distribution network. Indeed, it is very easy to identify, where appropriate, all elements belonging to a same electrical circuit and protected by a same circuit breaker. In particular, when the circuit breaker-router has the DCHP function, it is easy, in the second embodiment to identify the elements belonging to a same circuit because, de facto, they belong to a same LAN (or virtual LAN) and they will receive an address belonging to the same address range.

In particular, it becomes very easy to match ranges of addresses with floors from a building, even sets of floors or sets of real estate premises . . . .

Secondly, it becomes also possible to set up security rules which are specific to each circuit or to a set of circuits. Thus, for example, one may decide that some particular circuits located in particular premises of a building may not be subject to specific associations like those described in relation with FIG. 1B. More generally, one may decide also that only some sub-systems or circuit of an electrical network may be accessed via the Internet network. It will be so very easy to authorize the control of the opening of a portal via the Internet network, and more specifically via a 3G type mobile phone—but not the control of some other electrical circuits of a building etc. . . .

Thirdly, it becomes possible to realize even more complex combinations increasing the flexibility of the control, based on the logic organization of LAN called <<virtual>> made of elements belonging to different circuits. This increased flexibility allows considering any sort of scenario of switching-on and extension, from the simplest to the most sophisticated, combining the more complex variations such as timers, switching-on and extension . . . .

Fourthly, the second embodiment which has been described previously facilitates greatly the management of maintenance and in particular the fault tolerance. Indeed, when all routers are identical and integrate the hardware resources (processor 261, memories 262-263 in particular) and adequate logics, they are all capable of replacing each other in case of proven failure of one of them.

In a preferred embodiment, as this has been mentioned previously, a single circuit breaker router—for example circuit breaker router 701—implements all virtual routing functions allowing to route packets within the electrical installation and, in particular, contains the integrality of routing tables within its internal memory. Other routers 702-704, identical to this last one, include also a copy of routing tables implemented in the operational router, and are configured in a stand-by mode in order to take the relay in case of a failure occurring in the operational router 701.

Indeed, when a failure of router 701 happens, it should be noted that, in general, the <<circuit breaker>> part of this module will remains operational because this one does not include any sensitive electronic part or component. Therefore, the electrical circuit 110 will remains powered and protected against overcharges as in normal operation.

On the other hand, and this is a significant advantage of the present invention, the <<routing>> function which is no more operational within the circuit breaker 701 can be replaced by one of the stand-by circuit breakers, for example circuit breaker 702 which takes the relay after an activation phase. This circuit breaker can also inform the end-user of the failure by any appropriate means, such as an email transmitted directly to the end-user email address.

Circuit breakers 702-704 can detect a failure of the operational circuit breaker 701 by means of any appropriate polling mechanism.

In a particular embodiment circuit breakers routers include a removable electronic circuit placed in a drawer and including the integrality of electronic elements, such as processor 261, memory 262 or 263 of FIG. 2 etc. . . . . Thus, it becomes very easy to replace a removable failing circuit by a new one, like in the old-time conventional <<fuses>> that end-users had to replace in the past.

It should be noted that, and this is a significant advantage of the present invention, that the implementation of routing protocols allows the automatic learning from removable circuits just put in place in a given circuit breaker router. In particular, the circuit breaker router implements procedures called HELLO allowing recovering routing tables needed to re-establish broken communications.

Figure 8:
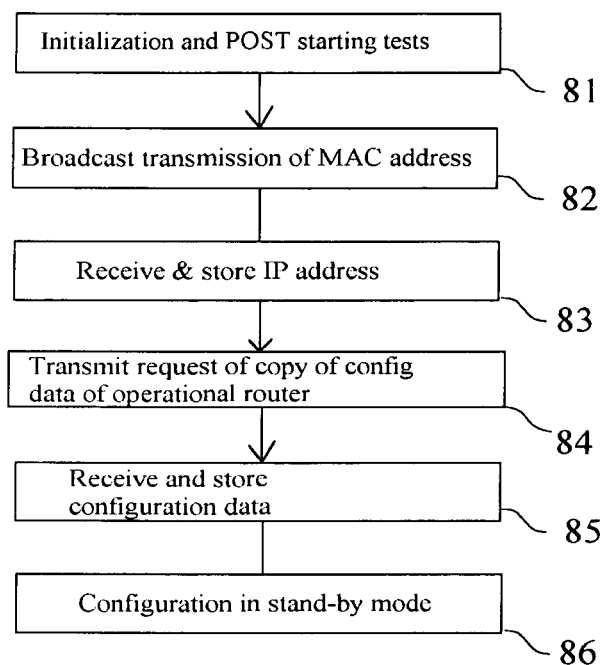
FIG. 8 illustrates the procedure when starting a router-breaker.

FIG. 8 illustrates the procedure implemented in a communicating circuit breaker allowing acquiring, when powered-on, needed information to place it in stand-by mode, pending the entry into operational mode.

This procedure is in particular implemented when one circuit breaker—in accordance with one embodiment of the invention—is installed and connected for the first time to the electrical energy distribution network. Such procedure is also launched when, after a physical failure of the removable electronic 260 placed in a slot of the circuit breaker—similar to old well known <<fuses>>, a new electronic module is being installed in the circuit breaker in order to replace the failed one.

The procedure starts following a step 81 of initialization during which the electronic circuit runs a series of internal test or tests POST.

Then, in a step 82, the electronic circuit 260 transmits in BROADCAST mode its MAC address.

In a step 83, because it is assumed that one pre-existing communicating circuit breaker has configured its DHCP server as being active and operational, the module 260 which has been installed and connected to the network therefrom receives its IP address and stores it within its non volatile memory.

In a step 84, the process generates a request in order to get a copy of the memory of the operational router, and information stored in this router including, in particular, the different routing tables together with the VLAN configurations (Virtual LAN).

The operational circuit breaker transmits this copy of configuration information, in particular the routing tables, and this information is received and stored within the non volatile memory of circuit breaker 114 in a step 85.

Then, in a step 86, circuit breaker 114 just installed configures itself in a stand-by mode where already other circuit breakers are, waiting for the activation of their routing function.

The invention claimed is:

1. A process for communication between two modules or elements in a single phase or three-phase electrical energy distribution network for a home or industrial premise comprising the steps of:
   providing said electrical energy distribution network comprising the following elements:
   circuit beakers;

electrical modules;
switches;
electrical plugs; and
light connection devices;
assigning a first IP address to a first element of said electrical energy distribution network and loading said first IP address within said first element;
assigning a second IP address to a second element of said electrical energy distribution network and loading said first IP address within said second element; and
establishing a communication between said first and second elements based on said first and second IP addresses;
wherein said first and second elements are configured to enter into a configuration mode whereby said first and second IP addresses are exchanged for the purpose of creating an association between said first and second elements, wherein said first element is a switch and said second element is an electric plug, a wall plug or socket, a light connection device, or a socket intended to allow connection of an electrical light whereby said association results in said switch controlling the switch on or off of said second element.

2. The process according to claim 1 wherein said assigning said first and second IP addresses is realized by means of a DHCP, BootP or RARP protocol.

3. The process according to claim 1 wherein said communication between said first element and said second element is performed by Powerline Communications (PLC).

4. The process according to claim 2 wherein said assigning said first and second IP addresses is realized by means of a DHCP server located within a circuit breaker.

5. The process according to claim 2 wherein said communication is done by means of circuit breaker routers providing network segmentation of said electrical energy distribution network in virtual LAN sub-networks.

6. The process according to claim 5 wherein all routers providing exchange of packets between different said virtual LAN sub-networks are instantiated concentrated in one single said circuit breaker router operating for the whole said electrical energy distribution network and that all other circuit breaker routers are configured in a stand-by mode to mitigate the dysfunction of the operational single said circuit breaker router.

7. The process according to claim 1 wherein said first element is a circuit breaker, differential or not, fitted with means for receiving and storing an IP address and for exchanging IP packets.

8. A switching device to be connected to an electrical energy distribution network having communication between two modules or elements in said electrical energy distribution network for a home or industrial premise comprising said electrical energy distribution network comprising the following elements:
circuit beakers;
electrical modules;
switches;
electrical plugs; and
light connection devices;
wherein a first IP address is assigned to a first element of said electrical energy distribution network and loaded within said first element, a second IP address is assigned to a second element of said electrical energy distribution network and loaded within said second element, and a communication is established between said first and second elements based on said first and said second IP addresses;
wherein said first and second elements are configured to enter into a configuration mode whereby said first and second IP addresses are exchanged fir the purpose of creating an association between said first and second elements, wherein said first element is a switch and said second element is an electric plug, a wall plug or socket, a light connection device, or a socket intended to allow connection of an electrical light whereby said association results in said switch controlling the switch on or off of said second element;
said switching device comprising:
a terminal block or board allowing connection to said electrical energy distribution network;
a server for storing an IP address; and
a router for generating IP packets in order to establish a communication with other elements in said electrical energy distribution network.

9. The switching device according to claim 8 wherein said first and second IP addresses are assigned by means of a DHCP, BootP or RARP protocol.

10. The switching device according to claim 8 wherein said communication between said elements is performed by Powerline Communications (PLC).

11. The switching device according to claim 9 wherein said first and second IP addresses are assigned by means of a DHCP server located within a circuit breaker.

12. The switching device according to claim 9 wherein said communication is done by means of circuit breaker routers providing network segmentation of said electrical energy distribution network in virtual LAN sub-networks.

13. The switching device according to claim 12 wherein all routers providing exchange of packets between different said virtual LAN sub-networks are instantiated concentrated in one single said circuit breaker router operating for the whole said electrical energy distribution network and that all other circuit breaker routers are configured in a stand-by mode to mitigate the dysfunction of the operational single said circuit breaker router.

14. The switching device according to claim 8 wherein said first element is a circuit breaker, differential or not, fitted with means for receiving and storing an IP address and for exchanging IP packets.

15. A socket or plug to be installed in a wall and to be connected to an electrical energy distribution network having communication between two modules or elements in said electrical energy distribution network for a home or industrial premise comprising
said electrical energy distribution network comprising the following elements:
circuit beakers;
electrical modules;
switches;
electrical plugs; and
light connection devices;
wherein a first IP address is assigned to a first element of said electrical energy distribution network and loaded within said first element, a second IP address is assigned to a second element of said electrical energy distribution network and loaded within said second element, and a communication is established between said first and second elements based on said first and said second IP addresses;
wherein said first and second elements are configured to enter into a configuration mode whereby said first and second IP addresses are exchanged for the purpose of creating an association between said first and second elements, wherein said first element is a switch and said second element is an electric plug, a wall plug or socket, a light connection device, or a socket intended to allow connection of an electrical light whereby said association results in said switch controlling the switch on or off of said second element;

said socket or plug comprising:
- a terminal block or board allowing connection of said socket or plug to said electrical energy distribution network;
- a connector allowing connection of said socket or ping for distribution of power to one appliance;
- a server for storing an IP address; and
- a router for generating IP packets for the purpose of establishing a IP communication with other elements of said electrical energy distribution network.

16. The socket or plug according to claim 15 wherein said first and second IP addresses are assigned by means of a DHCP, BootP or RARP protocol.

17. The socket or plug according to claim 15 wherein said communication between said elements is performed by Powerline Communications (PLC).

18. The socket or plug according to claim 16 wherein said first and second IP addresses are assigned by means of a DHCP server located within a circuit breaker.

19. The socket or plug according to claim 16 wherein said communication is done by means of circuit breaker routers providing network segmentation of said electrical energy distribution network in virtual LAN sub-networks.

20. The socket or plug according to claim 19 wherein all routers providing exchange of packets between different said virtual LAN sub-networks are instantiated concentrated in one single said circuit breaker router operating for the whole said electrical energy distribution network and that all other circuit breaker routers are configured in a stand-by mode to mitigate the dysfunction of the operational single said circuit breaker router.

21. The socket or plug according to claim 15 wherein said first element is a circuit breaker, differential or not, fitted with means for receiving and storing an IP address and for exchanging IP packets.

22. The socket or plug according to claim 15 wherein distribution of power to said one appliance is controlled by means of said IP communication.

23. A light connection device to be connected to an electrical energy distribution network having communication between two modules or elements in said electrical energy distribution network for a home or industrial premise comprising said electrical energy distribution network comprising the following elements:
- circuit beakers;
- electrical modules;
- switches;
- electrical plugs; and
- light connection devices;

wherein a first IP address is assigned to a first element of said electrical energy distribution network and loaded within said first element, a second IP address is assigned to a second element of said electrical energy distribution network and loaded within said second element, and a communication is established between said first and second elements based on said first and said second IP addresses;

wherein said first and second elements are configured to enter into a configuration mode whereby said first and second IP addresses are exchanged for the purpose of creating an association between said first and second elements, wherein said first element is a switch and said second element is an electric plug, a wall plug or socket, a light connection device, or a socket intended to allow connection of an electrical light whereby said association results in said switch controlling the switch on or off of said second element;

said light connection device comprising:
- a terminal block allowing connection of said light connection device to said electrical energy distribution network;
- a connector allowing connection of a light;
- a server for storing an IP address; and
- a router for generating IP packets in order to establish a communication with other elements of said electrical energy distribution network.

24. The light connection device according to claim 23 wherein said first and second IP addresses are assigned by means of a DHCP, BootP or RARP protocol.

25. The light connection device according to claim 23 wherein said communication between said elements is performed by Powerline Communications (PLC).

26. The light connection device according to claim 24 wherein said first and second IP addresses are assigned by means of a DHCP server located within a circuit breaker.

27. The light connection device according to claim 24 wherein said communication is done by means of circuit breaker routers providing network segmentation of said electrical energy distribution network in virtual LAN sub-networks.

28. The light connection device according to claim 27 wherein all routers providing exchange of packets between different said virtual LAN sub-networks are instantiated concentrated in one single said circuit breaker router operating for the whole said electrical energy distribution network and that all other circuit breaker routers are configured in a stand-by mode to mitigate the dysfunction of the operational single said circuit breaker router.

29. The light connection device according to claim 23 wherein said first element is a circuit breaker, differential or not, fitted with means for receiving and storing an IP address and for exchanging IP packets.

30. The light connection device according to claim 23 further comprising switching means being controlled by exchange of IP packets.

31. A circuit breaker for an electrical panel of an electrical energy distribution network having communication between two modules or elements in said electrical energy distribution network for a home or industrial premise comprising said electrical energy distribution network comprising the following elements:
- circuit beakers;
- electrical modules;
- switches;
- electrical plugs; and
- light connection devices;

wherein a first IP address is assigned to a first element of said electrical energy distribution network and loaded within said first element, a second IP address is assigned to a second element of said electrical energy distribution network and loaded within said second element, and a communication is established between said first and second elements based on said first and said second IP addresses;

wherein said first and second elements are configured to enter into a configuration mode whereby said first and second IP addresses are exchanged for the purpose of creating an association between said first and second elements, wherein said first element is a switch and said second element is an electric plug, a wall plug or socket, a light connection device, or a socket intended to allow connection of an electrical light whereby said association results in said switch controlling the switch on or off of said second element;

said circuit breaker comprising:
an input terminal block allowing connection of at least two conductors, including a PHASE conductor and a NEUTRAL conductor;
a protected output terminal block including at least two conductors;
a server for storing an IP address; and
a router allowing exchange of IP packets throughout said electrical energy distribution network with other elements or modules of said network.

32. The circuit breaker according to claim 31 wherein said first and second IP addresses are assigned by means of a DHCP, BootP or RARP protocol.

33. The circuit breaker according to claim 31 wherein said communication between said elements is performed by Powerline Communications (PLC).

34. The circuit breaker according to claim 32 wherein said first and second IP addresses are assigned by means of a DHCP server located within a circuit breaker.

35. The circuit breaker according to claim 32 wherein said communication is done by means of circuit breaker routers providing network segmentation of said electrical energy distribution network in virtual LAN sub-networks.

36. The circuit breaker according to claim 35 wherein all routers providing exchange of packets between different said virtual LAN sub-networks are instantiated concentrated in one single said circuit breaker router operating for the whole said electrical energy distribution network and that all other circuit breaker routers are configured in a stand-by mode to mitigate the dysfunction of the operational single said circuit breaker router.

37. The circuit breaker according to claim 31 further comprising a DHCP, BootP or RARP server, possibly disengageable, allowing assignment of IP addresses, in particular to elements of said electrical energy distribution network.

38. The circuit breaker according to claim 31 further comprising a router fitted with means for storing routing tables for the purpose of achieving the routing of IP packets generated from and transferred to communicating elements of said electrical energy distribution network and belonging to a LAN sub-network.

39. The circuit breaker according to claim 38 further comprising means to ensure simultaneously all functions of routing required by all LAN sub-networks so that a single circuit breaker ensures the routing for the overall said electrical energy distribution network.

40. The circuit breaker according to claim 39 wherein said circuit breaker includes a stand-by mode allowing it to substitute for an operational circuit breaker in case of failure of said operational circuit breaker.

41. The circuit breaker according to claim 31 wherein said circuit breaker further comprises a removable electronic circuit allowing easy replacement of a deficient said electronic circuit.

42. A socket for connection to an electrical energy distribution network having communication between two modules or elements in said electrical energy distribution network for a home or industrial premise comprising said electrical energy distribution network comprising the following elements:
circuit beakers;
electrical modules;
switches;
electrical plugs; and
light connection devices;

wherein a first IP address is assigned to a first element of said electrical energy distribution network and loaded within said first element, a second IP address is assigned to a second element of said electrical energy distribution network and loaded within said second element, and a communication is established between said first and second elements based on said first and said second IP addresses;

wherein said first and second elements are configured to enter into a configuration mode whereby said first and second IP addresses are exchanged for the purpose of creating an association between said first and second elements, wherein said first element is a switch and said second element is an electric plug, a wall plug or socket, a light connection device, or a socket intended to allow connection of an electrical light whereby said association results in said switch controlling the switch on or off of said second element;

said socket comprising:
a base for connection of a light bulb, said base receiving two conductors respectively phase and neutral,
a controlled switching device allowing to switch-off current delivered to said light bulb; and
a control device powered by said two phase and neutral conductors and including a server for allowing an IP communication allowing exchanging messages for control or not of said light bulb connected on said socket.

43. The socket according to claim 42 wherein said first and second IP addresses are assigned by means of a DHCP, BootP or RARP protocol.

44. The socket according to claim 42 wherein said communication between said elements is performed by Powerline Communications (PLC).

45. The socket according to claim 43 wherein said first and second IP addresses are assigned by means of a DHCP server located within a circuit breaker.

46. The socket according to claim 43 wherein said communication is done by means of circuit breaker routers providing network segmentation of said electrical energy distribution network in virtual LAN sub-networks.

47. The socket according to claim 46 wherein all routers providing exchange of packets between different said virtual LAN sub-networks are instantiated concentrated in one single said circuit breaker router operating for the whole said electrical energy distribution network and that all other circuit breaker routers are configured in a stand-by mode to mitigate the dysfunction of the operational single said circuit breaker router.

48. The socket according to claim 42 wherein said first element is a circuit breaker, differential or not, fitted with means for receiving and storing an IP address and for exchanging IP packets.

* * * * *